Oct. 6, 1931.     D. H. BEELMAN     1,826,496
PLASTER CUTTER
Filed Dec. 10, 1930
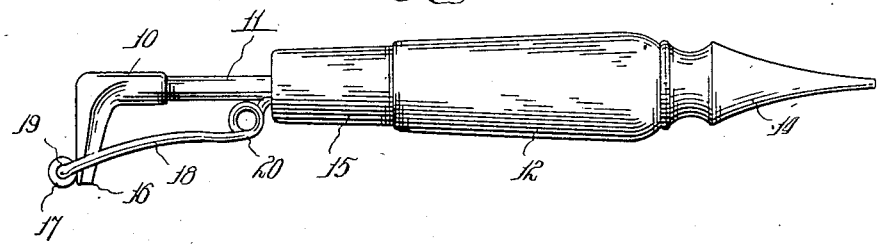
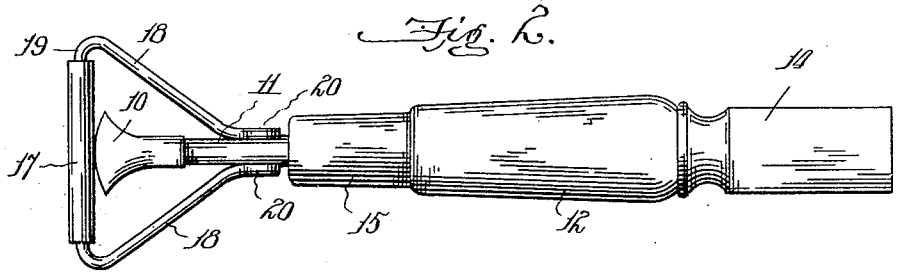
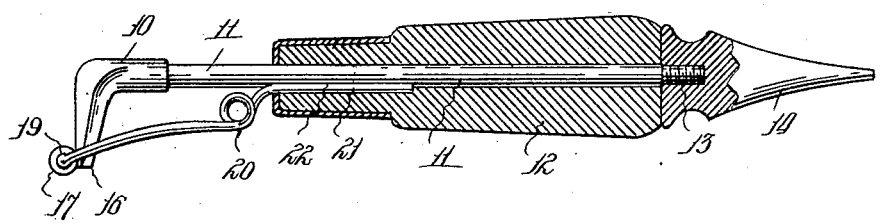
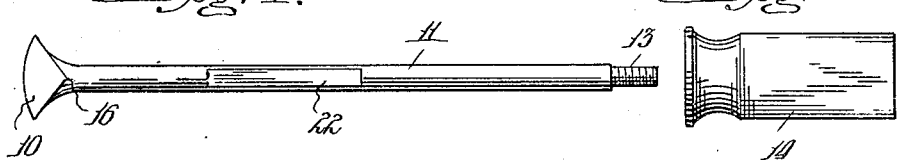
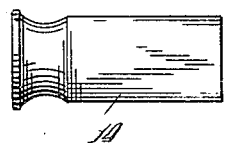
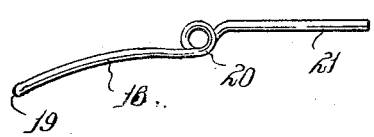
Inventor
D. H. Beelman
By  *[signature]*
Attorney.

Patented Oct. 6, 1931

1,826,496

UNITED STATES PATENT OFFICE

DAVID H. BEELMAN, OF MOUNT VERNON, NEW YORK

PLASTER CUTTER

Application filed December 10, 1930. Serial No. 501,355.

My invention is an improvement in tools for special work, and relates more especially to a tool for use in widening the cracks in plastered walls so that they can be more easily filled in pointing up.

The principal object of my invention is to provide a handled tool or implement for use by plasterers, painters, paper-hangers, and other workmen which will greatly facilitate the operation of preparing cracks and other defects in plastered walls, in the present instance providing a cutting implement or scraper in the form of a claw with a tension device for regulating the depth to which the scraper will enter the crack and in which the shape of said cutting implement is such that it will bevel the edges of the crack to better receive the plaster or filling material used in pointing up the wall for finishing the surface thereof by painting or papering.

A further object of my invention is to provide an implement of this character with a wedge-shaped scraper or blunt chisel at the other end of the handle from the cutting tool which can be used in cutting out plaster in corners or other places where the cutting tool in the form of a claw cannot be conveniently used.

With these principal objects in view my invention consists of a plaster cutter which is strong and durable in construction, and can be easily and conveniently manipulated, all as hereinafter fully described and more specifically set forth in the appended claims.

In the accompanying drawings:

Figure 1 is a side elevation of an implement for cutting plaster constructed in accordance with my invention.

Fig. 2 is a plan view of the implement.

Fig. 3 is a longitudinal sectional view.

Fig. 4 is a detail view of the claw-shaped cutting tool.

Fig. 5 is a detail view of the wedge-shaped scraper or blunt chisel at the other end of the handle from the claw-shaped cutting tool, and Fig. 6 is a detail view of the spring tension device for the roller which regulates the depth of cut.

Like numerals of reference indicate like parts in the different figures of the drawings.

In carrying out my invention one part of the tool or implement is in the form of a claw 10 having a shank 11 by which it is connected to a handle 12 passing through the center thereof and projecting beyond the rear end where said shank is reduced in diameter to provide a threaded tang 13 for securing the wedge-shaped scraper or blunt chisel 14 to the end of the handle opposite the claw, the forward end of the handle from which the claw projects having a ferrule 15. As will be noted by reference to the drawings the claw projects at an angle from the shank and is substantially diamond-shaped at its lower end with an angular or V-shaped point 16 at the center of the inner side of said claw, this part of the tool or implement being used for the purpose of scratching or beveling the edges of a crack to receive material as plaster in pointing up or closing the crack.

In order to keep the claw-shaped scraper upright and limit the extent to which it enters the crack in the wall to be enlarged for pointing up I provide a roller 17 carried by a tension device and located at the outer side of the end of the scraper, said tension device consisting of arms 18, 18 secured to the handle and diverging therefrom with the roller rotatably mounted on the crosspiece 19 connecting said arms, the latter being under spring tension for which purpose the supporting device for the roller is formed of spring wire with a coil 20 at the inner end of each arm beyond which the terminal portions 21 of the wire extend into the handle for attachment thereto. To intimately connect the spring device and shank of the claw-shaped cutter to the handle the underside of the shank is cut away or recessed at 22 to receive the terminal portions 23 of the wire forming the tension device for supporting the roller, said recess being of the same length as said terminal portions to insure binding engagement with the handle when the wedge-shaped scraper or blunt chisel 14 is threaded on the other end of the shank.

It will be noted that in making up the tool I employ a thick handle which will give a firm grip to the tool, and that by extending the shank of the claw-shaped cutting tool entirely through the handle it not only provides a strong and durable connection but also provides for attaching the wedge-shaped tool to the other end of the handle, said wedge-shaped tool being screwed up tightly to clamp the parts together. Furthermore, the manner of connecting the spring tension device to the handle also provides for more securely connecting the parts together, the terminals of the wire being seated in the recess in the shank and prevents the same from slipping in the handle.

The uses to which the implement may be put will be readily understood from the foregoing description. In cutting out a crack in the wall to receive plaster or other filling material the end of the claw-shaped scraper is inserted in the crack and the depth to which it is forced will be regulated by the roller which is under spring tension, the roller bridging the crack to bear against the wall at either side thereof, it being understood of course that the tool or implement is held in substantially upright position so that the end of the cutter will enter the crack and that the cutting point being angular in shape will bevel the edges of the crack so that the filling material may be more easily applied. The wedge-shaped tool or blunt chisel at the other end of the implement is used for cutting cracks located in the corner of a room or other place where the claw-shaped cutting tool cannot be conveniently used, said wedge-shaped tool or blunt chisel being also usable in the same manner as an ordinary scraper.

As hereinbefore stated the roller under spring tension will limit the extent to which the claw-shaped tool enters the crack it is desired to enlarge, and although I have illustrated the preferred form of tension device the arrangement may be changed or modified and other changes resorted to in the construction of the implement and shape of the cutting tools at opposite ends of the handle within the spirit and scope of the appended claims.

I claim:

1. A cutting implement comprising a handle, a cutting tool extending from one end of said handle and projecting at an angle thereto, the end of the tool being in the form of a V-shaped point for enlarging a crack in a plastered wall and beveling the edges of the crack, and a spring tension device associated with the tool for limiting the depth of the cut.

2. A cutting implement comprising a handle, a cutting tool extending from one end of said handle and projecting at an angle thereto, the end of the tool being in the form of a V-shaped point for enlarging a crack in a plastered wall and beveling the edges of the crack, and a roller under spring tension located at the outer end of the cutting tool to limit the depth of cut of said tool.

3. A cutting implement comprising a handle, a cutting tool extending from one end of said handle and projecting at an angle thereto, the end of the tool being in the form of a V-shaped point for enlarging a crack in a plastered wall and beveling the edges of the crack, and a spring tension device for limiting the depth of cut of the tool consisting of spring arms diverging from the handle and a roller carried at the outer end of said arms beyond the cutting edge of the tool.

4. A cutting implement comprising a handle, a cutting tool extending from one end of said handle and projecting at an angle thereto, the end of the tool being in the form of a V-shaped point for enlarging a crack in a plastered wall and beveling the edges of the crack, and a spring tension device for limiting the depth of cut of the tool consisting of a length of spring wire bent upon itself to form a connecting portion and arms converging therefrom and formed into coils with terminal portions projecting beyond said coils into the handle of the implement, and a roller rotatable on the connecting portion beyond the cutting tool.

5. A cutting implement comprising a handle, a cutting tool extending from one end of said handle and projecting at an angle thereto, the end of the tool being in the form of a V-shaped point for enlarging a crack in a plastered wall and beveling the edges of the crack, the shank of the tool extending into the handle and having a recess at one side thereof, together with a spring tension device for limiting the depth of cut of the tool consisting of a length of spring wire bent upon itself to form a connecting portion and arms converging therefrom and formed into coils with the terminal portions projecting beyond said coils into the handle and into the recess in the shank of the cutting tool.

6. A cutting implement comprising a handle, a cutting tool extending from one end of said handle and projecting at an angle thereto, the end of the tool being in the form of a V-shaped point for enlarging a crack in a plastered wall and beveling the edges of the crack, the shank of the tool extending into the handle and having a recess at one side thereof, together with a spring tension device for limiting the depth of cut of the tool consisting of a length of spring wire bent upon itself to form a connecting portion and arms converging therefrom and extending into the handle and recess in the shank of the tool, and a roller rotatable on the connecting portion of the spring tension device beyond the cutting tool.

DAVID H. BEELMAN.